US008335234B2

(12) United States Patent
Fillod et al.

(10) Patent No.: US 8,335,234 B2

(45) Date of Patent: Dec. 18, 2012

(54) SYNCHRONISED CONTROL METHOD OF A PLURALITY OF FORMATTING EQUIPMENT AND STREAM FORMATING EQUIPMENT

(76) Inventors: Stéphane Fillod, Rennes (FR); Pascal Gravoille, Cesson Sevigne (FR); Stéphane Guillemot, La Chapelle des Fougeretz (FR)

( * ) Notice: Subject to any disclaimer, the term of this patent is extended or adjusted under 35 U.S.C. 154(b) by 321 days.

(21) Appl. No.: 12/589,471

(22) Filed: Oct. 23, 2009

(65) Prior Publication Data

US 2010/0103956 A1 Apr. 29, 2010

(30) Foreign Application Priority Data

Oct. 23, 2008 (FR) ..................................... 08 57217

(51) Int. Cl.
*H04J 3/24* (2006.01)
*H04J 3/06* (2006.01)

(52) U.S. Cl. ......................... 370/474; 370/503; 370/509

(58) Field of Classification Search .................. 370/474, 370/480, 503, 509, 537, 540
See application file for complete search history.

(56) References Cited

U.S. PATENT DOCUMENTS 6,968,017 B2* 11/2005 Nielsen ......................... 375/316
2006/0088023 A1 4/2006 Muller
2007/0074267 A1* 3/2007 Clerget et al. ................. 725/136
2009/0023385 A1* 1/2009 Blineau et al. ............... 455/13.1
2009/0168812 A1* 7/2009 Crookes et al. ............... 370/537
2009/0168813 A1* 7/2009 Crookes et al. ............... 370/542
2010/0103950 A1* 4/2010 Statelov et al. ............... 370/468
2011/0038384 A1* 2/2011 Chevalier et al. ............. 370/474

OTHER PUBLICATIONS

Gronewald U: Das UberallFernsehen—Fernsehen Uberall Zwischenbilanz einer Weltpremiere; Internet Citation; May 15, 2003, pp. 1-8 XP-002508836.

European Search Report dated Jun. 25, 2009.

* cited by examiner

*Primary Examiner* — Kerri Rose

(74) *Attorney, Agent, or Firm* — Meagher Emanuel Laks Goldberg & Bovino, LLP

(57) ABSTRACT

The present invention relates to the domain of control methods of a plurality of formatting equipment (FE1, FE2) of streams (TS) used as backup. The items of equipment receive the streams (TS) and send, to a modulator (MOD1), formatted streams (TS_SFN1, TS_SFN2) comprising a succession of blocks of packets called "megaframe" and megaframe initialization packets (MIP) used by the modulator (MOD1) to identify in time a megaframe ($MF_n$) relatively to a time base (TB). According to the invention, the method comprises steps consisting in:

defining a reference date (DREF) that corresponds to the transmission date of a megaframe ($MF_1$), determining a current date (DCOUR) common to the equipment (FE1, FE2), determining a temporal position (POS) of a megaframe ($MF_n$) after the date (DCOUR) in relation to the time base (TB) from a temporal position of the megaframe ($MF_n$) determined in relation to the date (DREF), determining a megaframe initialization packets (MIP) content from the temporal position (POS), inserting the packet (MIP) in the formatted streams (TS_SFN1, TS_SFN2).

12 Claims, 5 Drawing Sheets

$$N = FLOOR((DCOUR\text{-}DREF)/T_B)$$

$$n = FLOOR((DCOUR\text{-}DREF)/T_{MF}) + 1$$

$$POS = FLOOR((n.T_{MF} - N.T_B)/T_A)$$

SYNCHRONISED CONTROL METHOD OF A PLURALITY OF FORMATTING EQUIPMENT AND STREAM FORMATING EQUIPMENT

BACKGROUND OF THE INVENTION

1. Field of the Invention

The present invention relates, according to a first aspect, to the domain of synchronised control methods of a plurality of signal formatting equipment. According to a second aspect, the invention relates to a pair of signal formatting equipment, said equipment is used as backup to supply an item of transmission equipment and to reduce the impact on the transmission of a switch from one item of equipment to the other.

The present inventions relate more precisely to the field of networks of the type "Single Frequency Network" or "SFN".

2. Description of the Prior Art

In the prior art, an SFN network is a network of transmitters, radio or analogue or digital television, operating over a single frequency in a determined region. As shown in FIG. 1, all the transmitters constituting this network, whether they are adjacent or not, use an identical frequency $F_1$ to send an identical signal. In FIG. 1, a transmitter is constituted by a modulator 10, 20, 30 and by an antenna 15, 25, 35. The advantage of such an architecture is double: it enables, on the one hand, to limit the frequencies used over a territory. Indeed, in a non-SFN transmitter network, if a frequency is used by a first transmitter, this frequency cannot be used by the transmitters adjacent to this first transmitter otherwise interference phenomena would be created. Moreover, it can improve the reception quality since, in an SFN network, the signals received from several adjacent transmitters are no longer destructive between each other but on the contrary constructive.

To implement such a network architecture, it is necessary to comply with certain conditions: the transmitters constituting the network must all use the same modes of modulation and they must also transmit exactly the same signal temporally. For this DVB standard specifies, in the document "ETSI TS 101 191, V1.4.1 (2004-06) Digital Video Broadcasting (DVB); DVB mega-frame for Single Frequency Network (SFN) synchronization", a mechanism making it possible to synchronize the streams emitted by different transmitters of an SFN network.

The signal to emit is broken down into megaframes whose length depends on the modulation mode chosen for the transmission. Synchronisation packets, frequently designated using the name "Megaframe Initialisation Packet" or using their acronym "MIP", are inserted into the signal to send. They contain temporal pointers that enable the transmitters to position these frames exactly in time on the basis of an extremely accurate time base present at the level of the transmitters and which is common to them. The time base is for example of the GPS type. Hence, when the time base has the form of a signal (pulse) at 1 Hz and a clock signal at 10 MHz, these two frequencies being perfectly stable, the MIP points to the start of the next megaframe that starts for example on the $1120^{th}$ clock pulse following the last pulse to date delivered by the time base.

The signal to transmit TS_SFN1, that will be assumed to be SFN formatted, is generated by an item of formatting equipment FE1 from a signal TS. In particular, the formatting equipment FE1 inserts the MIP synchronisation packets, not shown in FIG. 1, in the TS signal. The signal TS_SFN1 is sent to several modulators 10, 20, 30 that all generate a modulated signal strictly identical and in phase for each one of its associated antenna 15, 25, 35.

As for any critical link in a transmission system, it is strongly advisable to be able to have a redundant architecture for the formatting equipment FE1. It is thus hoped to overcome one of the faults of the item of equipment FE1 or to authorise maintenance actions without interrupting the service. Most often, recourse is made to a standard architecture, shown in FIG. 2 that consists in supplying a modulator MOD, 10 by at least two items of formatting equipment FE1, 1; FE2, 2 in a parallel configuration. Each item of equipment EF1, EF2 thus receives the same signal TS and produces a formatted signal SFN: TS_SFN1, TS_SFN2 intended for the modulator MOD.

To make the explanations clearer, a switch SW, 9 receives the signals TS_SFN1 and TS_SFN2 and sends either TS_SFN1 or TS_SFN2 to the modulator MOD according to whether one of the two items of equipment EF1, EF2 is faulty or out of service during a maintenance operation. The switch SW can naturally be inserted into the modulator MOD that will then be provided with 2 inputs.

As things currently stand, this architecture has the disadvantage of not allowing one formatted signal SFN to be switched to the other without having a noticeable effect on the transmission. Indeed, the structure of the megaframes is imposed by the modulation mode and is consequently recognised by the two items of equipment FE1, FE2 that thus generate identical megaframes.

In the rest of this document, it has been chosen to represent the formatted streams as a succession of megaframes $MF_1, \ldots, MF_i, MF_{i+1}, MF_n$ where i is an index identifying each megaframe in a unique manner. The megaframes $MF_1, \ldots, MF_n$ all have a known identical duration $T_{MF}$. The duration of the megaframes is identical and is noted as $T_{MF}$.

The date of the start of transmission of the first megaframe is left to the free choice of each item of equipment FE1, FE2: it is basically related to a choice made when the items of equipment FE1, FE2 are powered up.

Hence, considering a handover of the signal TS_SFN1 to the signal TS_SFN2 at a date $T_{SW}$ as shown in FIG. 3, the resulting signal TS_SFN3 contains, at the moment of the handover, a megaframe (here $MF_{n-2}$) of an abnormally large size (or small depending on the case). In a transitory manner, the modulator, MOD in the presence of such a signal can no longer generate a coherent modulated signal. It must wait to find an input signal compliant with the type of modulation that is its own to generate a modulated signal again. At worst, two successive megaframes are lost on each handover.

For the handover not to lose any megaframes on transmission, it therefore appears advisable to ensure that the two items of equipment FE1, FE2 redundantly supply the modulator generating megaframes ($MF_1, \ldots, MF_n$) perfectly in phase, with an accuracy in line with the required accuracy for implementing an SFN network.

The most immediate solution to the problem posed by a generation of signals in phase by a plurality of backup equipment FE1, FE2 consists in interconnecting the equipment EF1, EF2 together by defining an information exchange protocol between the equipment FE1, FE2 to ensure that this backup equipment generates signals TS_SF1, TS_SFN2 in phase. But this solution is a source of strong architectural and interconnection constraints. In addition, it is poorly adapted to an 'n+p' architecture where 'n' items of formatting equipment (not necessarily generating the same megaframe structures) are backed up by 'p' items of formatting equipment. Moreover, this architecture is extremely vulnerable to the network latency that can lead the equipment FE1, FE2 to take non-phased decisions.

One of the purposes of the present invention is to overcome these different disadvantages.

SUMMARY OF THE INVENTION

The technical problem that the present invention proposes to resolve is to synchronise the emission of formatted signals by remote formatting equipment, used as backup.

For this purpose, the present invention relates, according to a first aspect, to a synchronised control method of a plurality of stream formatting equipment according to the claim 1 attached.

The present invention relates, according to a second aspect, an item of stream formatting equipment according to claim 9 attached.

Advantageously, the formatted streams TS_SFN1, TS_SFN2 complies with the DVB standard.

Advantageously, the formatted streams TS_SFN1, TS_SFN2 complies with the ISDB-T standard.

Advantageously, the formatted streams TS_SFN1, TS_SFN2 complies with the ATSC standard.

Advantageously, the formatted streams TS_SFN1, TS_SFN2 complies with the CMMB standard.

A first advantage of the invention resides in the fact that it is able to synchronise two items of remote formatting equipment in such a manner that they deliver two formatted signals perfectly in phase to a modulator MOD without requiring dedicated exchanges between the two items of formatting equipment. In such a manner, a continuity of service is provided without needing to deploy a network between the formatting equipment, a solution that would certainly represent a high cost.

A second advantage of the invention lies in the absence of any loss of megaframes when a first item of backup formatting equipment is interrupted by a second item of formatting equipment. Indeed, since the two items of equipment deliver the formatted streams perfectly in phase to the modulator, the formatted stream delivered by the second item of formatting equipment can be used immediately by the modulator to replace the stream of the first item of equipment.

A third advantage of the invention lies in its simplicity and in the economy of means required to implement it. Indeed, the formatting equipment is generally included in the multiplexers MUX that integrate, among other elements, an absolute clock. This absolute clock can advantageously be used to supply the current date required to implement the invention. An item of formatting equipment according to the invention thus requires very little extra means in relation to the formatting equipment of the prior art, which is an important argument if a campaign to upgrade equipment already installed in carried out.

BRIEF DESCRIPTION OF THE DRAWINGS

The invention will be better understood from the following description of an embodiment of the invention provided as an example by referring to the annexed figures, wherein.

DESCRIPTION OF THE PREFERRED EMBODIMENTS

Figure 1:
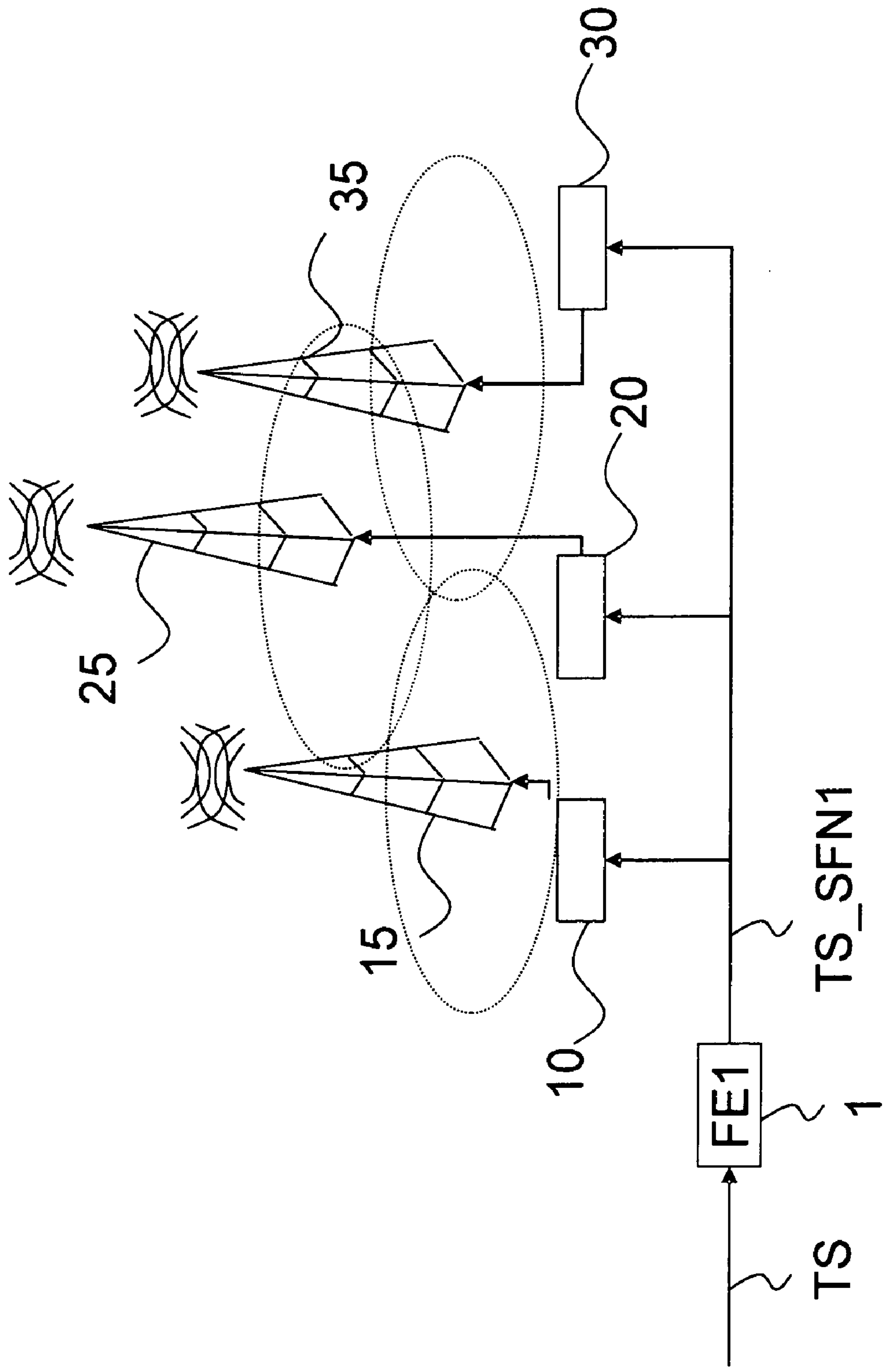
FIGS. 1 to 3 have already been described.
Figure 2:
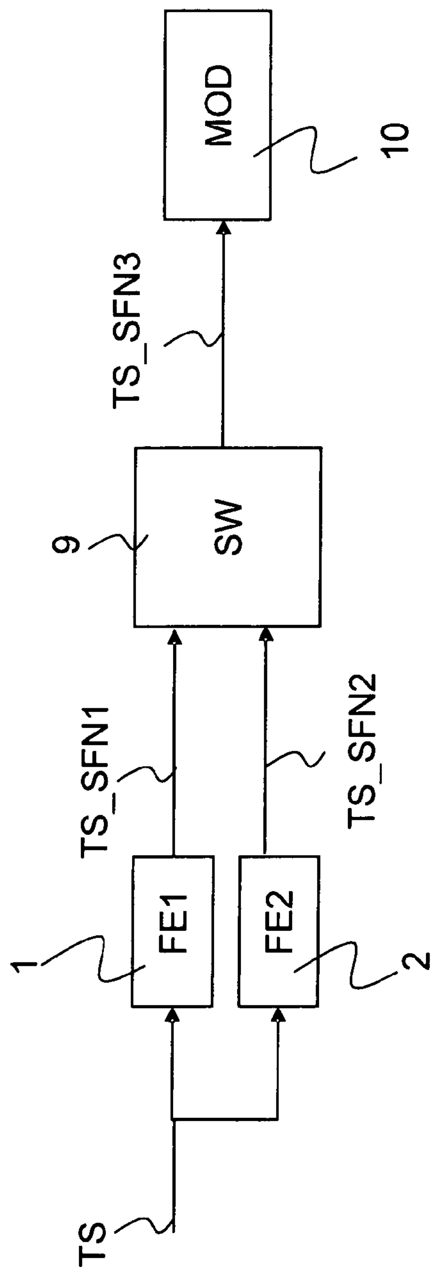
Figure 3:
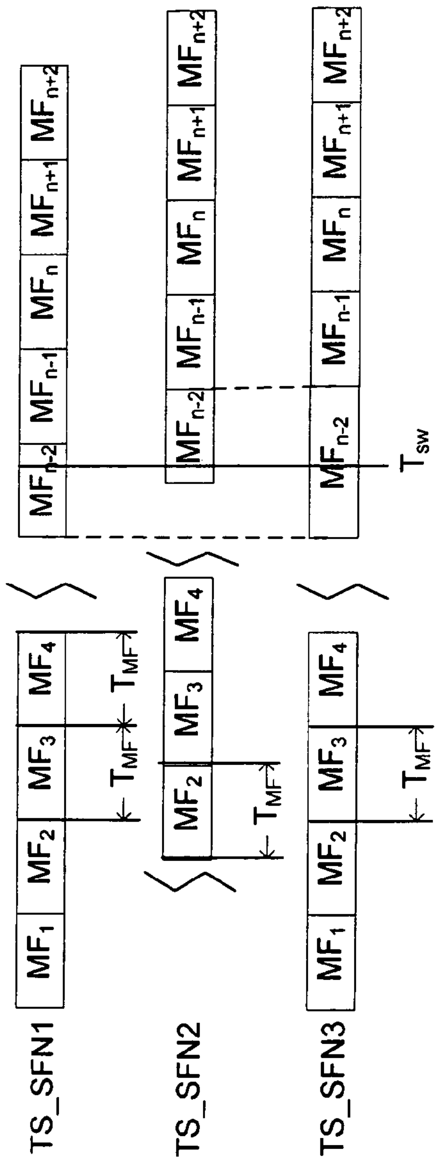
Figure 4:
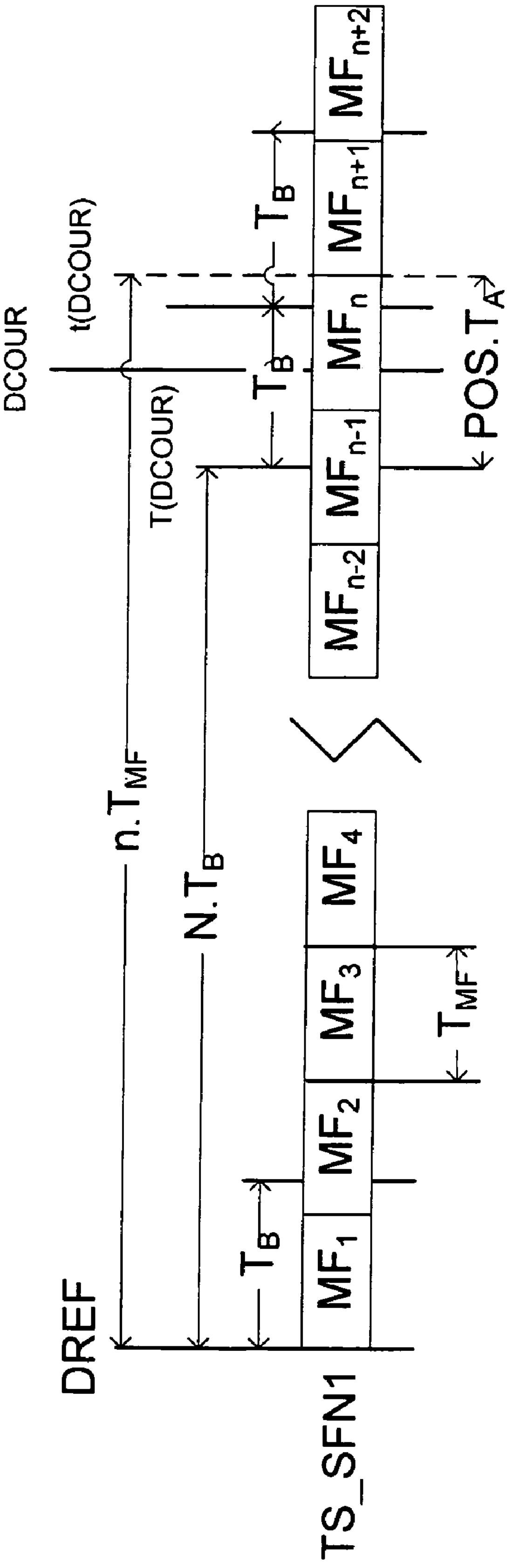
FIG. 4 illustrates an example of temporal position POS being used to define a content of megaframe initialisation packets.

FIG. 4 is a temporal representation of a formatted stream TS_SFN1 produced by an item of formatting equipment FE1, FE2 not shown in the figure. The formatted stream TS_SFN1 is constituted by a succession of megaframes $MF_1, \ldots, MF_i, MF_{i+1}, \ldots, MF_n$ where i is an index uniquely identifying each megaframe. The megaframes $MF_1, \ldots, MF_n$ all have a known identical time $T_{MF}$.

$MF_1$ is the first of the megaframes that, by convention, will have been transmitted at a reference data DREF=$t_1$ known by all the formatting equipment. It is therefore possible to determine, in relation to DREF, the date $t_n$ at which the megaframe $MF_n$ is transmitted:

$$t_i=(i-1)\cdot T_{MF} \text{ for } i \text{ strictly greater than one 1.}$$

Starting from this expression, it is also possible to determine, always in relation to DREF, the date t(DCOUR) that corresponds to the date at which a first megaframe will be sent after the current date DCOUR, considering an expression of the form: $t(DCOUR)=T_{MF}\cdot(FLOOR((DCOUR-DREF)/T_{MF})+1)$ where FLOOR designates the "integer part" mathematical function and DCOUR is expressed in the same time system as DREF.

Hence, if as shown in FIG. 4, DCOUR occurs after the start of the transmission of $MF_n$ and before the start of the transmission of $MF_{n+1}$, then t(DCOUR) corresponds to the transmission start date of the megaframe $MF_{n+1}$, namely a time $n\cdot T_{MF}$ after DREF. The date t(DCOUR) marking the start of the transmission of the first megaframe delivered after DCOUR is interesting as it constitutes a temporal pointer to the next megaframe.

Moreover, main pulses of periods $T_B$ and secondary pulses of period $T_A$, with $T_B$ greater than $T_A$, produced by a time base TB (not shown in FIG. 4) are received by all the formatting equipment FE1, FE2. The main and secondary pulses are delivered in phase with DREF. These pulses constitute a system of temporal references in which the temporal pointers can be expressed. For example, $T_B$ can be considered to be equal to 1 second, and $T_A$ equal to 100 nanoseconds.

By considering that the first main pulse is delivered at the date DREF, it is possible, in relation to DREF, determine a date at which the p-th main pulse is delivered by the expression $(p-1)\cdot T_B$, in which p is an index uniquely identifying a main pulse, p being a whole number greater than 1.

Starting from this expression, it is also possible to determine, always in relation to DREF, the date t(DCOUR) at which the last main pulse was delivered before the current date DCOUR, considering an expression of the form: $T(DCOUR)=T_B\cdot(FLOOR((DCOUR-DREF)/T_B))$ Hence if, as shown in FIG. 4, DCOUR occurs after the (N+1)-th main pulse was delivered and before the (N+2)-th main pulse was delivered, then T(DCOUR) corresponds to the date at which (N+1)-th main pulse is delivered, namely a time $N\cdot T_B$ after DREF.

The date T(DCOUR) marking the date at which the last main pulse was delivered before DCOUR is interesting as it can constitute a reference relative to which a temporal pointer can be expressed.

A temporal pointer on a future megaframe in relation to the last main pulse to date that is here the (N+1)-th main pulse, can be expressed in the form of the time $n\cdot T_{MF}-N\cdot T_B$.

Figure 5:
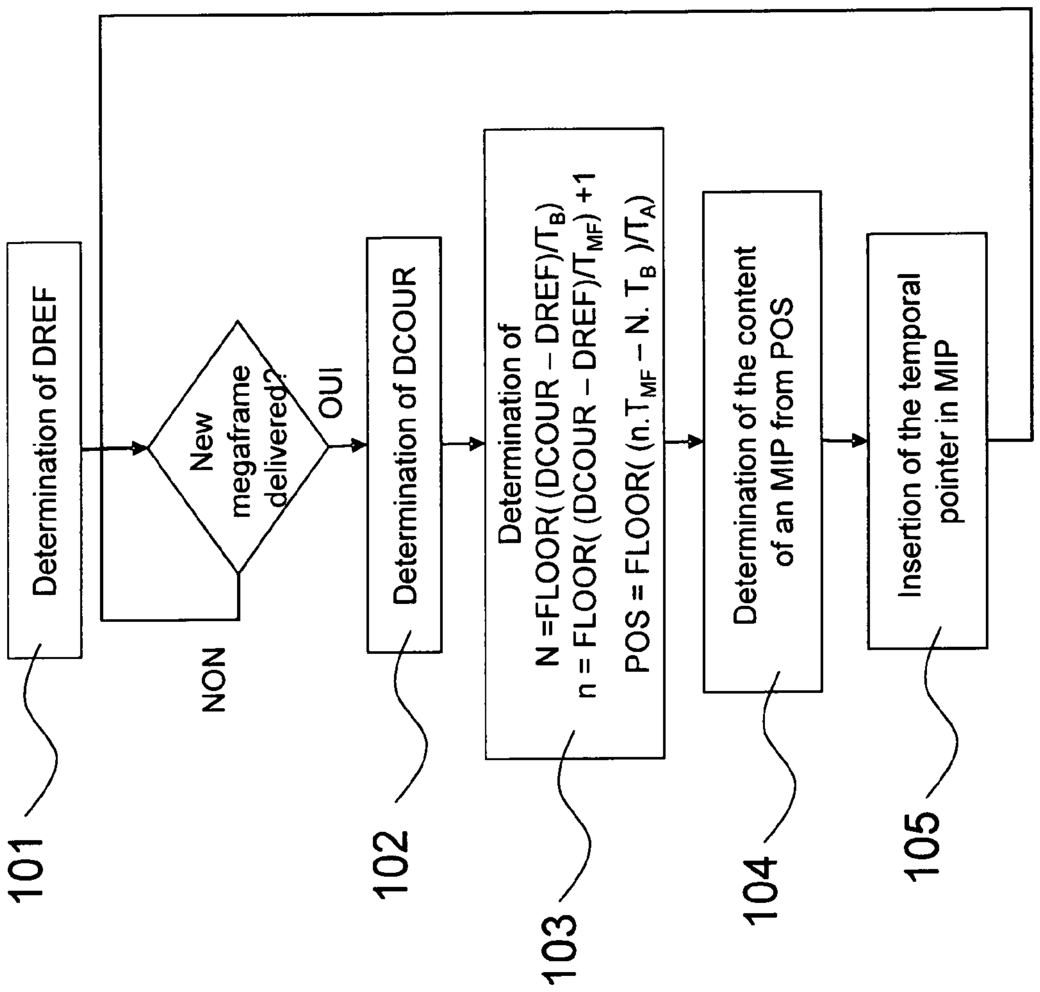
FIG. 5 shows a flowchart of a method according to the invention.

This time can also be expressed in the form of a number POS of periods $T_A$ separating the (N+1)-th main pulse of the transmission start date of the future megaframe $MF_{n+1}$. In this case, POS is expressed in the following form: POS=FLOOR $(n \cdot T_{MF} - N \cdot T_B)/T_A)$ FIG. 5 shows a flowchart of the control method according to the invention.

The first step 101 of the method consists in a definition of a reference date DREF that corresponds to the date at which, by convention, a megaframe $MF_1$ is sent. The date DREF is common to all the equipment FE1, FE2 and is expressed in a time system (TAB).

The second step 102 of the method consists in a determination, from a clock HA, of a current date DCOUR. The date DCOUR is not necessarily common to all the items of equipment FE1, FE2. Indeed, each item of equipment FE1, FE2 can individually initiate, at different times, a determination of the temporal positioning of the next megaframe. The DCOUR date is expressed in the time system (TAB).

The third step 103 of the method consists in the determination of a temporal megaframe position POS in relation to main pulses produced by the time base TB from a megaframe temporal position determined in relation to the reference date DREF.

As illustrated in FIG. 4, POS can correspond to a number of secondary pulses, separating the date of the last main pulse preceding DCOUR of the date of the start of the transmission of the next megaframe following the date DCOUR. The secondary pulses are also produced by the time base TB.

The fourth step 104 of the method consists in the determination of a content of MIP megaframe initialisation packets from POS temporal positions.

The fifth step 105 of the method consists in the insertion of MIP megaframe initialisation packets in the formatted flows TS_SFN1, TS_SFN2.

The steps 102 to 105 are executed in loops at each new generation of a megaframe detected during a transmission detection step 100 of a new megaframe.

Advantageously, the determination step 102 of the current date DCOUR has a better accuracy than $T_B/2$.

Figure 6:
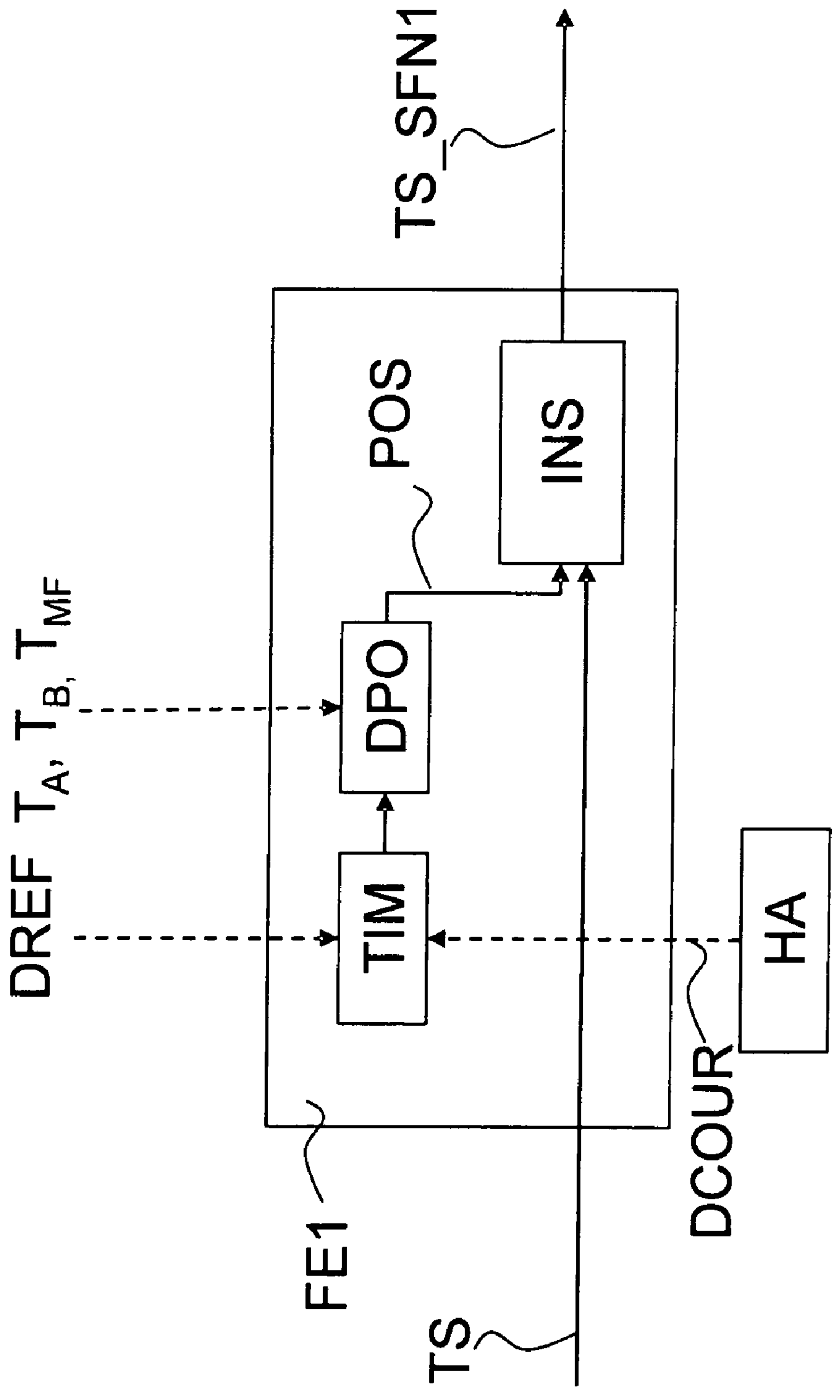
FIG. 6 shows an item of formatting equipment according to the invention.

FIG. 6 diagrammatically shows an item of formatting equipment FE1, according to the invention of a plurality of identical equipment FE1, FE2 used as backup. The item of equipment FE1 receives main pulses and secondary pulses produced by a time base TB, and having a respective period $T_B$, $T_A$. The plurality of equipment FE1, FE2 is suited to obtain a current date from a clock HA. The item of equipment FE1 receives a stream TS and delivers a formatted stream TS_SFN1, it comprises:

- storage means TIM to store a reference date (DREF) that corresponds by convention to the date at which a megaframe $MF_1$ is transmitted by the equipment FE1. The DREF date is expressed in a time system TAB and is common to all the equipment FE1, FE2,
- TIM means to determine a current date supplied by a clock HA in the time system TAB,
- DPO means to determine a temporal position POS of megaframe $MF_n$ in relation to the main pulses, from a megaframe temporal position determined in relation to the date DREF. The DPO means receive the main and secondary pulses and have means for assessing their respective period $T_A$, $T_B$,
- INS means to insert, into the formatted stream TS_SFN1, MIP synchronisation packets comprising a content determined from POS temporal positions.

Advantageously, the time system TAB is a system of absolute time.

Advantageously, the clock HA is a clock supplied by a GPS receiver.

Advantageously, the clock (HA) operates according to the Network Time Protocol.

The invention is described in the preceding text as an example. It is understood that those skilled in the art are capable of producing variants of the invention without leaving the scope of the patent.

The invention claimed is:

1. Synchronised control method of a plurality of formatting equipment (FE1, FE2) of streams (TS), said items of equipment (FE1, FE2) receiving the stream (TS) and transmitting to at least one modulator (MOD1, MOD2) a formatted stream (TS_SFN1, TS_SFN2) each comprising a succession of blocks of packets called "megaframes" (MF1, MF2, . . . , MFn) and megaframe initialisation packets (MIP) comprising a pointer to a subsequent megaframe, said packets (MIP) being used by the modulator (MOD1, MOD2) to temporally identify a temporal position of a megaframe (MFn) relatively to pulses supplied by a time base (BT), said pulses being received by the items of equipment (FE1, FE2) and the modulator (MOD1, MOD2), the method comprising:

- defining a reference date (DREF) that corresponds, by convention, to the transmission date of a megaframe (MF1) by the equipment (FE1, FE2), said date (DREF) is expressed in a time system (TAB) and is common to the plurality of equipment (FE1, FE2), and at each transmission of a megaframe (MFn):
- determining a current date (DCOUR) from a clock (HA) common to the plurality of equipment (FE1, FE2), said date (DCOUR) is expressed in the time system (TAB),
- determining a temporal position (POS) of a megaframe (MFn+1) relatively to the time base (TB) from a temporal position of the megaframe (MFn+1) determined relatively to the reference date (DREF),
- determining a megaframe initialisation packet (MIP) content from the temporal position (POS),
- inserting the megaframe initialisation packet (MIP) in the formatted stream (TS_SFN1, TS_SFN2).

2. Method according to claim 1, the time base (TB) delivering the main pulses having a period TB, wherein the determination step of the current date (DCOUR) has a better accuracy than TB/2.

3. Method according to claim 2, the time base (TB) further delivering secondary pulses having a period TA, where TA is less than TB, wherein the temporal position (POS) is expressed in a number of periods TA.

4. Method according to claim 1, wherein the definition step of the date (DREF) consists in a reading of a date value (DREF) stored in a storage means of the equipment (FE1, FE2).

5. Method according to claim 1, wherein the formatted streams (TS_SFN1, TS_SFN2) comply with the DVB standard.

6. Method according to claim 1, wherein the formatted streams (TS_SFN1, TS_SFN2) comply with the ISDB-T standard.

7. Method according to claim 1, wherein the formatted streams (TS_SFN1, TS_SFN2) comply with the ATSC standard.

8. Method according to claim 1, wherein the formatted streams (TS_SFN1, TS_SFN2) comply with the CMMB standard.

9. System for driving a plurality of equipment (FE1, FE2) for formatting streams (TS), said system comprising said equipments (EF1, EF2), at least one modulator (MOD1, MOD2) and a time base (BT), said equipment (FE1, FE2) delivering a formatted flow (TS_SFN1, TS_SFN2) to the modulator (MOD1, MOD2), the flow (TS_SFN1, TS_SFN2)

comprising a succession of blocks of packets called "megaframe" (MF1, MF2, . . . , MFn) and megaframe initialisation packets (MIP) comprising a pointer to a subsequent megaframe, said packets (MIP) being used by the modulator (MOD1, MOD2) to identify temporal positions of subsequent megaframes (MFn) relatively to pulses supplied by a time base, said pulses being received by the item of equipment (FE1, FE2) and the modulator (MOD1, MOD2), the system comprising:

a memory configured to store a reference date (DREF) that corresponds, by convention, to the date at which a megaframe (MF1) is transmitted by the equipment (FE1, FE2), said date (DREF) is expressed in a time system (TAB) and is common to all the equipment (FE1, FE2), a timing module (TIM) configured to determine a current date (DCOUR) supplied by a clock (HA) in the time system (TAB), a position module (DPO) configured to determine a temporal position (POS) of megaframe MFn relatively to said pulses from a megaframe temporal position determined relatively to the date (DREF), an insertion module (INS) configured to insert, into the formatted stream (TS_SFN1, TS_SFN2), synchronisation packets (MIP) comprising a content determined from said temporal positions (POS).

10. System according to claim 9, wherein the time system (TAB) is a system of absolute time.

11. System according to claim 9, wherein the clock (HA) is a clock supplied by a GPS receiver.

12. System according to claim 9, wherein the clock (HA) operates according to the Network Time Protocol.

* * * * *